United States Patent
Sarkis (10) Patent No.: US 8,938,114 B2
(45) Date of Patent: Jan. 20, 2015

(54) IMAGING DEVICE AND METHOD FOR IMAGING HIDDEN OBJECTS

(71) Applicant: Sony Corporation, Minato-ku (JP)

(72) Inventor: Michel Sarkis, San Diego, CA (US)

(73) Assignee: Sony Corporation, Tokyo (JP)

( * ) Notice: Subject to any disclaimer, the term of this patent is extended or adjusted under 35 U.S.C. 154(b) by 63 days.

(21) Appl. No.: 13/734,609

(22) Filed: Jan. 4, 2013

(65) Prior Publication Data

US 2013/0176309 A1 Jul. 11, 2013

(30) Foreign Application Priority Data

Jan. 11, 2012 (EP) ..................................... 12150770

(51) Int. Cl.
*G06K 9/00* (2006.01)
*G06T 15/40* (2011.01)
*G01S 13/89* (2006.01)
*G01V 8/00* (2006.01)

(52) U.S. Cl.
CPC ............... *G06T 15/405* (2013.01); *G01S 13/89* (2013.01); *G01V 8/005* (2013.01)
USPC ......................................................... 382/154

(58) Field of Classification Search
None
See application file for complete search history.

(56) References Cited

U.S. PATENT DOCUMENTS

| | | | |
|---|---|---|---|
| 5,550,937 A | 8/1996 | Bell et al. | |
| 6,404,920 B1 | 6/2002 | Hsu | |
| 7,199,750 B2 | 4/2007 | Bourdelais et al. | |
| 7,773,205 B2 | 8/2010 | Cooper et al. | |
| 7,822,171 B2 * | 10/2010 | Bontus et al. | 378/11 |
| 8,213,672 B2 * | 7/2012 | Daly et al. | 382/100 |
| 2011/0019935 A1 * | 1/2011 | Kelm et al. | 382/275 |
| 2011/0181461 A1 | 7/2011 | Sarkis | |
| 2011/0241934 A1 | 10/2011 | Sarkis | |
| 2012/0019406 A1 | 1/2012 | Sarkis | |
| 2012/0188118 A1 | 7/2012 | Sarkis | |

OTHER PUBLICATIONS

Report of Invention, Oct. 31, 2011, pp. 17.
Federico Tombari, et al., "Classification and evaluation of cost aggregation methods for stereo correspondence", IEEE Conference on Computer Vision and Pattern Recognition, Jun. 2008, pp. 1-8.
S.B. Kotsiantis, "Supervised Machine Learning: A Review of Classification Techniques", Informatica 31, 2007, pp. 249-268.
R.K. Beatson, "Multiquadric B-splines", Journal of Approximation Theory 87, Article No. 89, 1996, pp. 1-24.
Carlos Wai Yin Leung, B.E. Hons. (UQ), "Efficient Methods for 3D Reconstruction from Multiple Images", University of Queensland, School of Information and Technology and Electrical Engineering, Feb. 2006, 263 pages.
Stephen Boyd, et al., "Convex Optimization", Cambridge University Press, 2009, 715 pages.

(Continued)

*Primary Examiner* — Daniel Mariam
(74) *Attorney, Agent, or Firm* — Oblon, Spivak, McClelland, Maier & Neustadt, L.L.P.

(57) ABSTRACT

An imaging device that segments a data set into one or more data sub-sets, each data sub-set comprising a plurality of measurement values of one or more neighboring spots; determines, per pixel, costs for the measurement values acquired at a position corresponding to a position of the pixel determines a pixel value for a pixel by determining a label value from a set of label values; and selects the measurement value at the spot indicated by the determined label as the pixel value.

22 Claims, 6 Drawing Sheets

(56) References Cited

OTHER PUBLICATIONS

Jonathan S. Yedidia, et al., "Understanding Belief Propagation and its Generalization", Mitsubishi Electric Research Laboratories, Inc. 2002, 35 pages.

Yuri Boykov et al., "Fast Approximate Energy Minimization via Graph Cuts", IEEE Transactions on Pattern Analysis and Machine Intelligence, vol. 23, No. 11, Nov. 2001, 18 pages.

* cited by examiner

IMAGING DEVICE AND METHOD FOR
IMAGING HIDDEN OBJECTS

CROSS REFERENCE TO RELATED APPLICATION

The present application claims the benefit of the earlier filing date of European Patent Application No. 12 150 770.1, filed on Jan. 11, 2012, the entire contents of which is incorporated herein by reference.

BACKGROUND

1. Field of the Disclosure

The present disclosure relates to an imaging device and method scanning a scene and reconstructing an image of the scene showing one or more hidden, not directly visible objects. The present disclosure relates further to a processing apparatus and method, in particular for use in the imaging device and method, as well as to a computer program and a computer readable medium.

2. Background

Constructing an active radar image is a delicate task. The images obtained from millimeter-wave and sub-millimeter radar data are susceptible to noise and may contain significant information in multiple range bin or depth layers. For example, in security applications it is necessary to check persons for hidden objects. Therefore, the relevant spots or voxels in this case are the ones that contain objects beneath the clothes. For instance, from an optical image of some objects and the corresponding height profile obtained by using an active millimeter wave radar sensor it can be noticed in the range profile that the image might not show the hidden objects in many cases. This is due to the fact that some materials and/or objects are not fully transparent with respect to the frequency used to construct this image and/or have higher reflectivities than other materials and/or objects at the frequency used by this sensor. Even when using methods like simple layer peeling the results will not be satisfactory since there could be many important layers upon which it has to be decided.

SUMMARY

It is an object of the present disclosure to provide an imaging device and method that overcome this shortcoming based on energy minimization and that enable the imaging of hidden, not directly visible objects. It is a further object of the present disclosure to provide a corresponding processor and processing method as well as a corresponding computer program for implementing the processing method and computer readable non-transitory medium.

According to an aspect of the present disclosure there is provided an imaging device for scanning a scene and reconstructing an image of the scene showing one or more hidden, not directly visible objects. The device comprising processing circuitry that segments a data set into one or more data sub-sets, each data sub-set comprising a plurality of measurement values of one or more neighboring spots; determines, per pixel, costs for measurement values acquired at a position corresponding to a position of the pixel by modifying measurement values of one or more data sub-sets that include at least one measurement value acquired at a position corresponding to the position of the pixel; determines a pixel value for a pixel by determining a label value from a set of label values, a label indicating a spot among the spots arranged at positions corresponding to the position of the pixel; selects the measurement value at the spot indicated by the determined label as the pixel value, wherein the label value is determined by determining an extremum of energy values determined for different spots of the data set by applying an energy function, the energy function forming a sum adding a first summand including the costs of the spots at the position corresponding to the position of the pixel for which the energy value is determined, and a second summand taking into account at least one of the costs of at least one neighboring spot at a neighboring position and a neighboring depth value within the data set.

The present disclosure is based on the idea to provide an imaging device and method, in particular an image reconstruction scheme, designated for radar images where information at different positions (in two dimensions) and at different depth levels can be measured. Thus, a three-dimensional data set of measurement values is obtained comprising a measurement value for each spot (also called voxel) of the three-dimensional space. Here, a spot corresponds to a location within the three-dimensional space spanned by the two axes of the measurement plane (corresponding to the two axes of the image to be reconstructed) and a third axis representing the depth level. The present disclosure can thus be applied in both active and passive imaging devices and methods, in particular in active radar imaging with range information using concepts like FMCW or pulse, or in active radar systems that can focus on different spots in space. Further, the present disclosure can also be applied in selected radiometric imaging devices and methods that can focus on different spots in space. The reconstruction task is formulated as an energy minimization problem. A cost function composed of two parts is formulated. The first part takes the interactions among the neighboring pixels of an image to be reconstructed into account. The second part is based on a parameter of the measured data, in particular the measured power at each spot in the range of interest. This second part of the cost function can be obtained using several techniques like clustering and/or segmentation algorithms, preferably in combination with machine learning algorithms. This step is necessary to target the optimization towards the desired important spots, e.g. to reveal the hidden objects in a target. Further, the cost function is solved using various optimization algorithms like belief propagation and graph cuts.

In other words, the present disclosure further emphasizes on the design of image reconstruction schemes as an optimization problem. It thus derives the necessary cost functions needed and the corresponding minimization algorithm to reconstruct the images from the measured data (e.g. radar data). The preferred frequency range used for imaging according to the present disclosure extends from 1 or a few GHz to a few THz, i.e. any frequency or frequency range with this range may be used for obtaining measured data. Fields of application of the present disclosure are, for instance, in security scenarios as well as in non-destructive testing or process control.

BRIEF DESCRIPTION OF THE DRAWINGS

These and other aspects of the present disclosure will be apparent from and explained in more detail below with reference to the embodiments described hereinafter. In the following drawings.

DETAILED DESCRIPTION

Figure 1A:
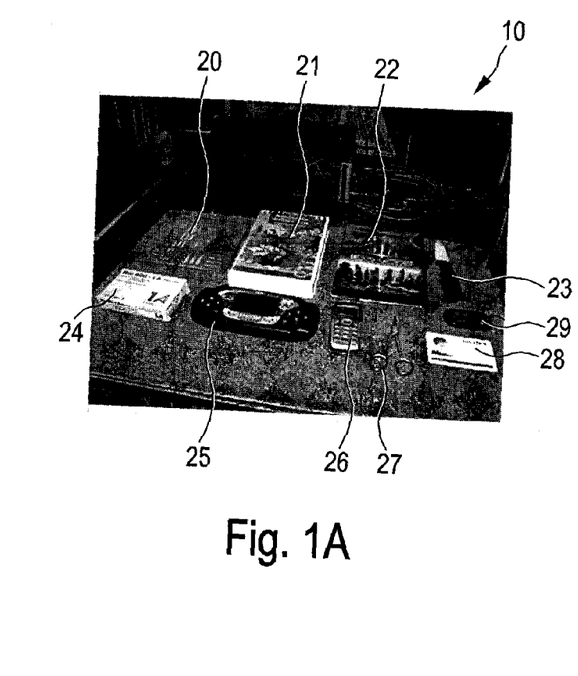
FIGS. 1A-1C show an optical image and corresponding height profiles of an exemplary scene obtained by a conventional method and by a method according to the present disclosure.
Figure 1B:
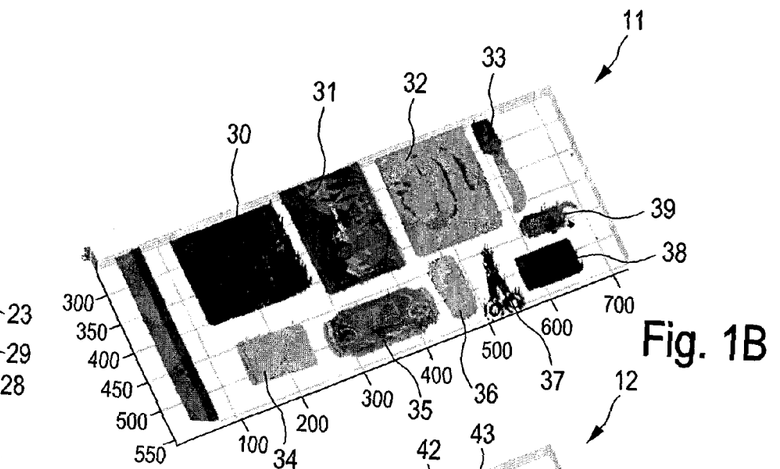
Figure 1C:
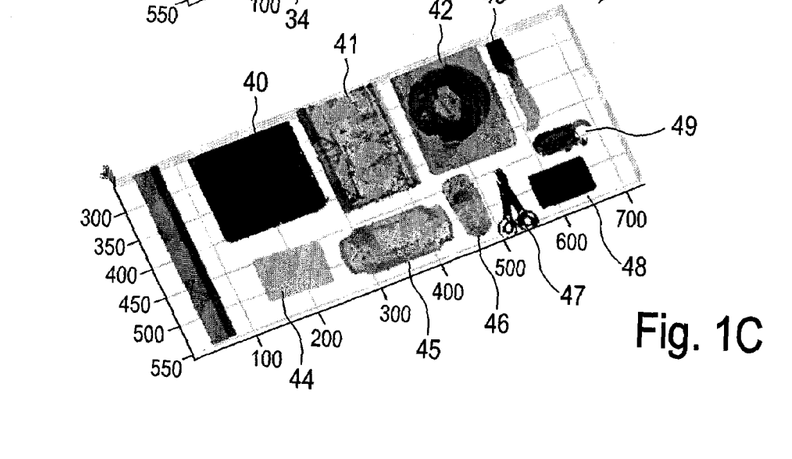

FIG. 1A shows an optical image 10 of a scene and FIG. 1B shows the height profile 12 of the scene 10 shown in FIG. 1A obtained by processing the data of a known millimeter-wave active radar, in particular of a Frequency-Modulated Continuous Wave (FMCW) active radar. The optical image 10 shows some objects 20 to 29. FIG. 1B shows the corresponding height profile image 11 of the height profiles 30 to 39 of the objects obtained by a conventional method. FIG. 1C shows the corresponding height profile image 12 of the height profiles 40 to 49 of the objects obtained by a method according to the present disclosure. It can be noticed in the height profile 11 shown in FIG. 1B that the image 10 contains some noise. In addition, looking at the CD 22 and the video tape 21, it can be noticed that the height profile 32 does not correspond to the CD 22 or the video tape 21 but to the covers of their boxes. This is since the covers of the CD 22 and the video tape 21 are not fully transparent with respect to the frequency used to construct this image. Moreover, the materials of the covers have higher reflectivities than the CD 22 or the video tape 21 at the frequency used by this active radar sensor.

Figure 2:
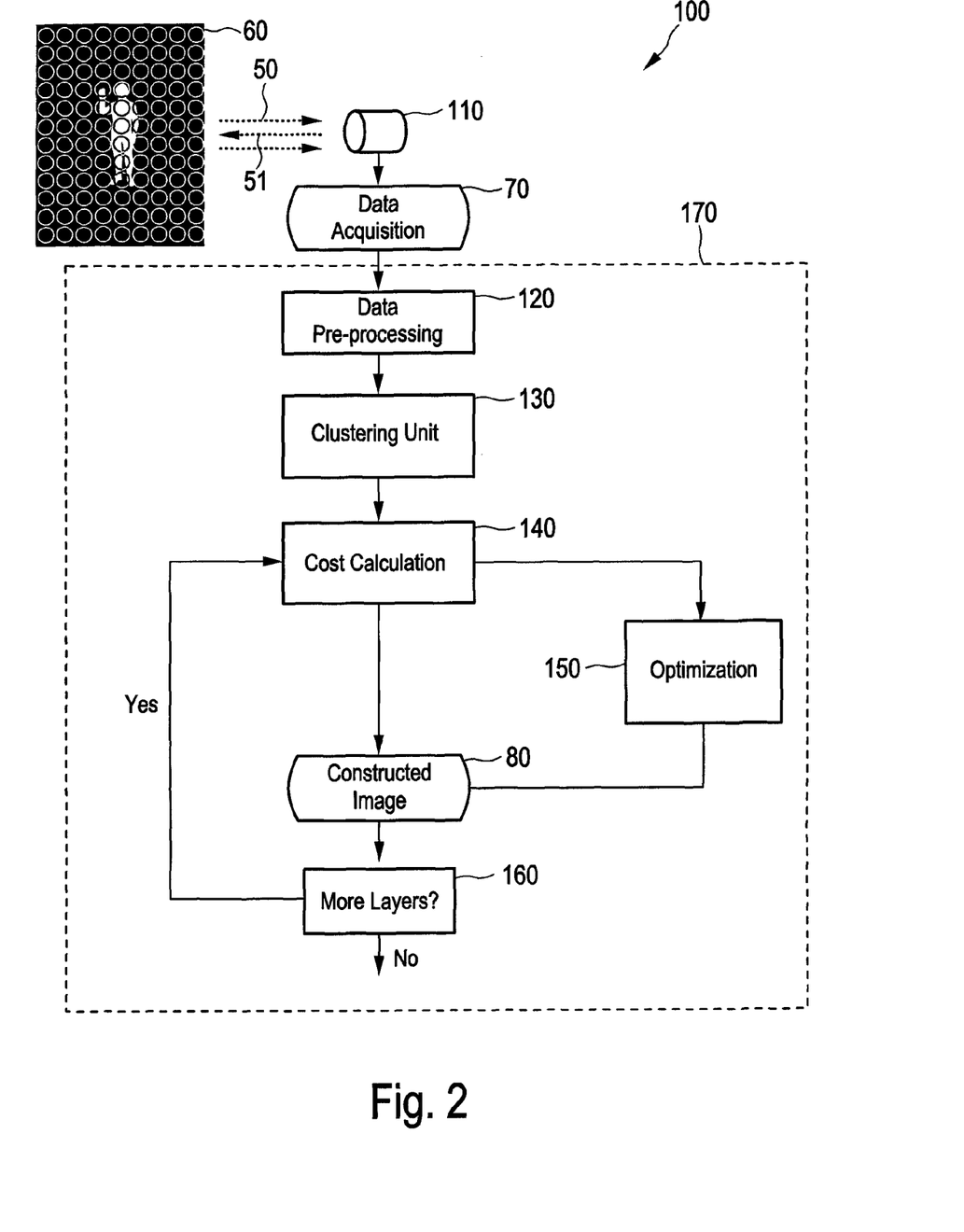
FIG. 2 shows a block diagram of an embodiment of an imaging device according to the present disclosure.

A first embodiment of an imaging device 100 according to the present disclosure is shown in FIG. 2. Electromagnetic signals 50 emitted from the scene 60, in particular one or more objects present in the scene, are captured by a measurement unit 110. The measurement unit 110 may be an active measurement unit, e.g. an active radar which emits signals 51 to the scene and detects all the reflection from the scene in response to the illuminating radiation 51. Alternatively, the measurement unit 110 may be a passive radiometer that detects radiation 50 emitted from the scene and that can preferably focus a measurement beam at various spots (positions and depth) in the scene 60. The measurement of the scene 60, i.e. the obtained measurement values are stored as three-dimensional data set 70, e.g. in a storage unit or memory, such as a hard disk or semiconductor memory of a computer.

The measurement values are then pre-processed in the pre-processing unit 120 to obtain the power or measurement at a certain spot (or voxel) in space which can be expressed in terms of reflectivities of an object of the scene, for example using methods like Fast Fourier Transform (FFT) in active radar imaging systems. In other embodiments the measurement values can also be pre-processed to obtain the temperature of the measured spot in some passive radar imaging systems. There are several known ways to measure the temperature of the measured spot depending on the sensor used. The stored measurement values 71 of the data set 70 will have the form of a 3D matrix filling a three dimensional space 200 comprising all the measured spots 201 as shown in FIG. 3, which, as an example, indicates two spots 201 (representing voxels of the 3D space 200) and the measurement values 71 (indicated by small dots and being part of the total data set 70 of measurement values) obtained at the spots 201.

The measurement values 71 are preferably (but not mandatorily) also standardized in the pre-processing unit 120. Standardization means that the data are preferably centered by the mean and then normalized by the standard deviation in the z-direction (depth dimension in case of FMCW radar). Standardization is not mandatory, but is a preferred pre-processing step to stabilize the numerical computations.

Still further, in an embodiment of the pre-processing unit 120 the measurement values 71 are preferably transformed using the logarithm transform after the standardization. The logarithm transform depends on the type of data. It can be a real logarithm in case of a real FMCW beat frequency of an active radar. It is also a real logarithm of the temperature data in case of radiometric systems. The logarithm transform can also be complex in some cases if complex beat frequencies are used. Whether the case is, all of the processes can be performed in full or in part in the pre-processing unit 120.

Figure 3:
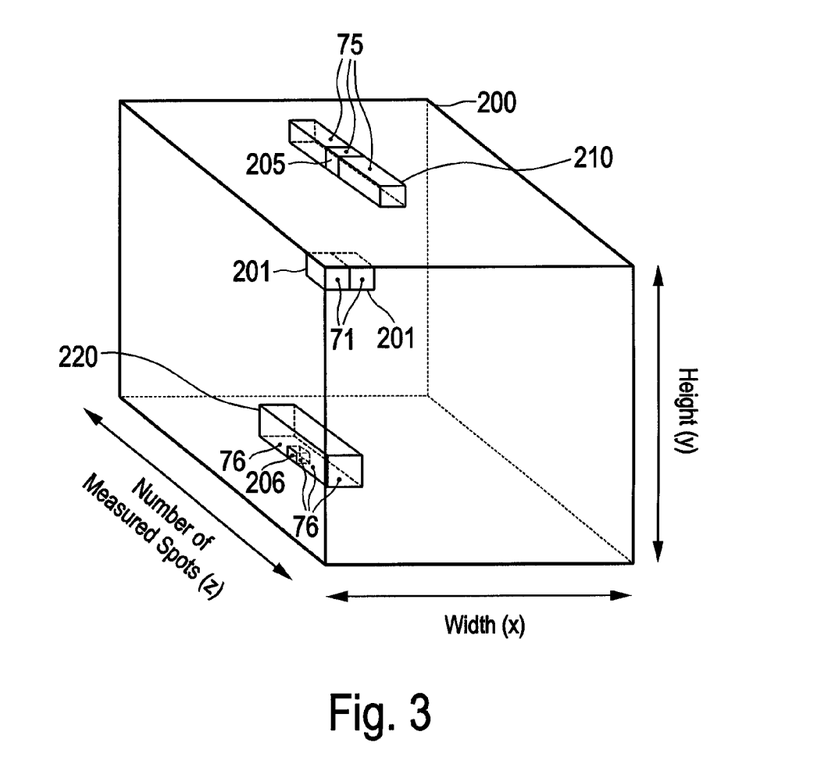
FIG. 3 shows a diagram of a space image representing the data set of obtained measurement values at all spots.

Having done that, the spots of the pixels form a so-called Space Image (SI) 200 as shown in FIG. 3 representing the three-dimensional data set 70 of the measurement values obtained at the spots. A spot in the SI 200 is indicated by 201. One aspect of the present disclosure involves finding one or more relevant piece-wise smooth curves within the measured spots. Thus, within the whole SI 200. Each curve should also reveal targets or hidden spots at the pixels if there are any. An assumption is made that the scene to be constructed is a piece-wise smooth surface. This is because the radiation emitted (passive) or reflections (active) from any real-life object have smooth variations except at the geometric edges; therefore, each piece (surface) is smooth, and this is why it is designated by a piecewise-smooth surface.

Briefly summarized, the present disclosure involves measuring at the spots in the measurement unit 110 to obtain measurement values of the data set 70. The measurement values are then preferably standardized and transformed with the logarithm transform in the pre-processing unit 120. The measured spots are clustered or segmented in a clustering unit 130 depending on which the costs are computed in a cost calculation unit 140. After that, the costs are passed to an optimization unit 150. The result of the optimization in the optimization unit 150 is at least one image 80 with revealed target layers if any. In the following several aspects and the various elements of the present disclosure will be explained in more detail.

The present disclosure clusters the spots of the pixel under consideration into account before calculating the costs in the cost calculation unit 140. This is done according to the present disclosure with the help of a clustering unit (CU) 130 before calculating the costs in the cost calculation unit 140. The costs are, for instance, metrics that describe how far the spots are from being piece-wise smooth and will also be calculated in a way to emphasize on the target layers. This will be explained below.

Before computing the costs, clustering unit 130 assigns a region for each spot of a pixel which contains the neighboring spots of the pixel and the neighboring spots of the neighboring pixels. Thus, in effect, corresponding to a segmentation of the three-dimensional (complete) data set 70 of the measurement values into data sub-sets of measurement values 75, 76 (some of them being indicated in FIG. 3 by dots), each data sub-set being represented in the SI 200 by a region (or cluster, or segment) 210, 220, each having a number of spots 205 and 206, respectively. For this purpose a commonly known segmentation algorithm as widely known and used in image processing may be used. In each of these regions 210, 220 the costs are assessed within the SI 200.

In one embodiment of the present disclosure, the CU 130 can only cluster the spots of each pixel separately. In another embodiment, the CU 130 clusters the spots of a pixel along with the spots of its neighboring pixels in the SI 200. In this case, the region around each spot can have the form of a cuboid (as shown in FIG. 3 for regions 210, 220) in the 3D space that contains part of the spots of the pixel itself and the corresponding parts of the neighboring pixels. The size of the cuboid can be the same across all the spots or can vary depending on the location of the spot under consideration as shown for the regions 210, 220 in FIG. 3. In a preferred embodiment, however, the CU 130 includes some algorithms that compute the optimal neighbors around each spot. Example algorithms that can be used for this purpose according to the present disclosure are variable windows, segment support, K-means, Singular Value Decomposition (SVD) or any similar technique that can segment or cluster the spots in the SI 200. In this case, the region around each spot might differ from a cuboid.

A summary of some of the schemes that can be applied to determine the neighbors of a spot in the SI 200 is provided in F. Tombari, S. Mattoccia, and L. Di Stefano, "Classification and evaluation of cost aggregation methods for stereo correspondence", IEEE Conference on Computer Vision and Pattern Recognition, pp. 1-8, June 2008. n element of the present disclosure is the optimization unit 150 for construct the radar image. The goal of the optimization is to find the extremum of the calculated costs (denoted by CO in the following) which corresponds to the optimal radar image while preserving the surface (smoothness) properties and emphasizing on the target layer(s) if any at the same time. The image should also emphasize on the hidden target layers at each pixels if any.

The radar image can be thought of as a surface where each pixel has a single associated value from all the possible label values. The goal of the optimization is to estimate at least one best spot number (or label L) at each pixel in the image that best describes the scene captured by the radar, where x is the row number of the pixel and y is its column number. It is important to note here that the length of x and y starts from 1 up to maximal dimensions X and Y specified by the user. Therefore an image to be reconstructed could in some cases consist only of one line, i.e. X×1 or 1×Y. Irrespective of the dimension of the image, the label L will represent the spot number of a pixel out of all the measured N spots in the SI 200. The label is defined to be the best label according to the present disclosure if it is an extremum in the computed costs. This will mean that the chosen label will satisfy the properties of the radar image and will emphasize on the hidden spot(s) if any. An equation that satisfies this point mathematically according to the present disclosure is $$E(\Delta) = \sum_{x,y} C(x, y, L) + \lambda \sum_{x,y} \sum_{x_i,y_i} \psi(L, L_i), \quad (1)$$

where $\Delta$ is one possible solution image of equation (6) (see below) from all the possible solutions, $E(\Delta)$ is the energy function which corresponds to the possible solutions $\Delta$, $C(x, y, L)$ is the cost of a label, $\psi(L, L_i)$ is a function that describes the relation or interaction between the label L at one pixel and the label of one of its neighbors $L_i$, and $\lambda$ is a weighting factor that regularizes the terms in $E(\Delta)$.

The term to the left in equation (1) describes the cost of a spot 201 in the SI 200 while the term to the right in equation (1) describes the interactions within the neighboring pixels in the SI. The left term of the equation (1) is a function of the received power at each spot or reflectivity for example in active radar image. It can also represent the temperature in case of radiometry. The left term will also assist to reveal or emphasize on hidden spots if any. The right term is the term that should enforce the properties of the radar surface according to the present disclosure when constructing the image and $\lambda$ is the term that weighs the costs of a spot with respect to the interaction with its neighbors.

It should be noted that the above equation (1) represents a preferred embodiment for use with the present disclosure, but several variations exist. For example, it is possible to place $\zeta$ in front of the left term in equation (1) or it is possible to optimize equation (1) by adding extra terms to the equation. Further, $\lambda$ is typically chosen according to the present disclosure as a positive real number.

The cost calculation that defines the cost of a label L of a pixel, the function $\psi(L, L_i)$ that describes the interaction between each pixel in the image with its neighbors and the optimization algorithm that can be used to reconstruct the radar image will now be discussed.

An object of the present disclosure is to find for each pixel in the image to be recon-structed at least one label L where L<N such that L reflects the position or the number of the measured spot in the SI and N is the total number of measured spots. In the measured spots of each pixel in the SI, the distribution of the reflected power vs. the spots is usually obtained which can be expressed as reflectivity in active radar, temperature for passive radars based on focal plane arrays or perhaps their standardized version. Regardless, the main issue is that the extremum value for each pixel may not designate the hidden spot or spots of the object but only the highest or lowest reflectivity with respect to its neighboring pixels. In security scenarios, however, the main interest is to uncover hidden objects in person or in a bag and not only the height profile for active radar for example. Therefore it is necessary to find some costs based on the measured data, i.e. measured entity at each spot, which allows us to uncover the hidden spots while preserving the properties of the radar image, i.e. piece-wise smooth. In other words, one element of the present disclosure is to process the measured data in such a way to enhance the chance of targeting the hidden spot(s) in the objects if any. Using I(x,y,L) as the measured power at the spots or the normalized version as was previously mentioned one goal of the present disclosure is to find a function $f$ according to equation (1) such that $$C(x,y,L) = f(I(x,y,L)) \quad (2)$$

Figure 4:
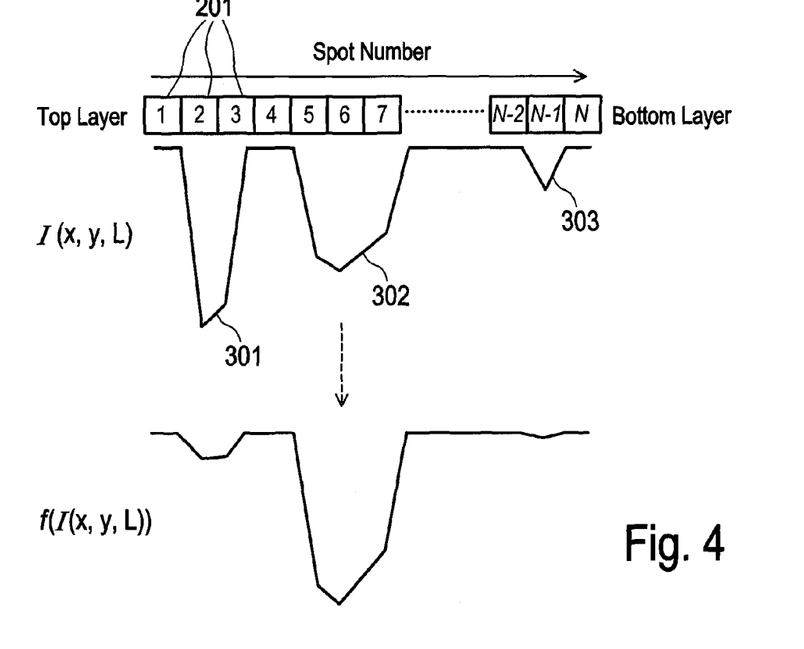
FIG. 4 shows an example diagram of measured spots and the cost computation.

The function $f(\ )$ should emphasize the hidden spots by modifying the measured data or their corresponding normalized values. To facilitate the understanding of this, FIG. 4 shows exemplary diagrams, in particular the plot of the power distribution at several spots of one pixel. As it can be seen, the power I(x,y,L) in this case has its extremum in spots two and three, which are also the top visible spots for this pixel. However, there are also some responses in spots five to six and in spot N−1. In a typical security scenario, the interesting spot(s) could be any of the spot five to seven or spot N−1, which are, contrary to spots two and three, usually not directly visible. Therefore, by performing a conventional optimization as will be explained below, the solution at this pixel will most likely fall between spots two and three when calculating the height profile in case of an active radar. However, according to the present disclosure the function $f(.)$ weighs or modifies I(x,y,L) in such a way to make the optimization choose one of the bottom spots and which are generally not directly visible (i.e. with human eyes and/or an optical camera). In the example shown in FIG. 4, the function $f(.)$ modifies I(x,y,L) in such a way to make the optimization algorithm favor spots five to seven.

Figure 5:
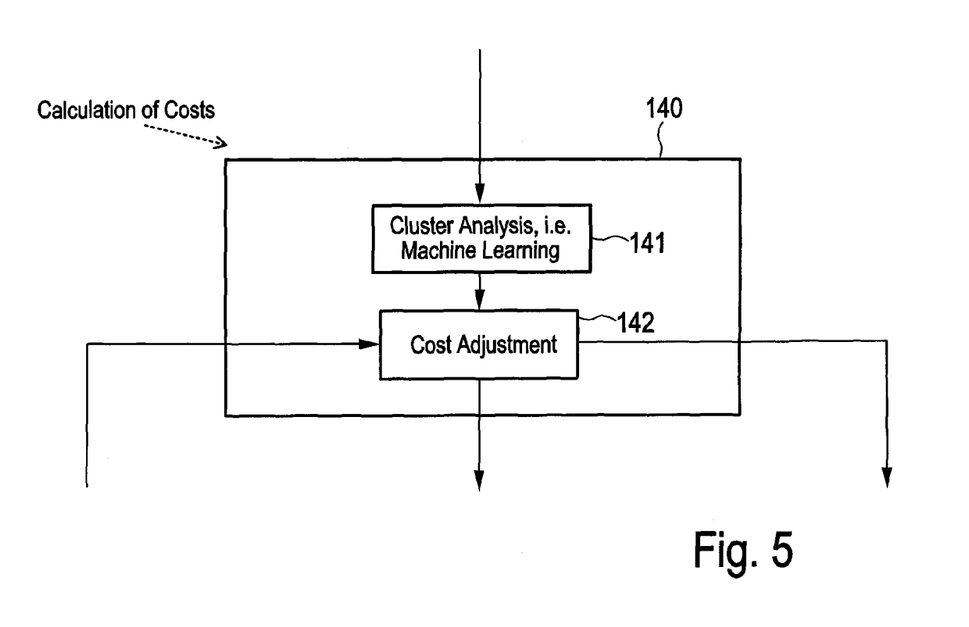
FIG. 5 shows a block diagram of an embodiment of a cost calculation unit according to the present disclosure.

A schematic block diagram of the cost calculation unit 140 is shown in FIG. 5 which will now be explained. The CU 130 determines the cluster or segment to which each spot of each pixel belong or, in other words, segments the complete data set of measurement values into data sub-sets of measurement values. This is preferably done for all spots 201 in the SI 200. Therefore, the spots of each pixel are potentially subdivided into two or more groups depending on the outcome of the clustering performed in the CU 130. Each of the groups potentially represents a possible object or part of an object. Consequently, the number of groups obtained for each pixel will represent the number of possible objects or parts of the objects that are available behind each other within the different spots of a pixel in the SI.

By looking at the example shown in FIG. 4 for a single pixel, it shall be assumed that the clustering results in three groups 301, 302, 303 (also called clusters or segments), i.e. a first group 301 which includes spots 2 and 3, a second group 302 which includes spots 5, 6 and 7 and a third group 303 which includes spot N−1. In this specific example, all the other values in the spots are assumed to be null and hence can be neglected in the calculations. Therefore, the target or hidden voxels or spots will be available in either of the second group 302 or the third group 303. This is since the first group 301 comprises objects that can be viewed without the modification of the measured power. In other words, one spot of the first group 301 will be most probably chosen by directly (and conventionally) optimizing equation (1) and using I(x,y,L) as costs. To modify I(x,y,L) and hence let it emphasize on a spot of the second or third group 302, 303 in the example depicted in FIG. 4, a suitable function $f(.)$ has to be found in a cost adjustment unit 142 which adjusts the costs as shown in FIG. 5 depicting more details of an embodiment of the cost calculation unit 140.

Thus, the cost calculation unit determines, per pixel, costs for the measurement values acquired at a position corresponding to the position of the pixel by modifying the measurement values of one or more data sub-sets that include at least one measurement value acquired at a position corresponding to the position of the pixel.

Before doing that, however, it is found out in a preferred embodiment whether group 302 and/or group 303, alone and/or or both of them, presents a significant object or part of an object. This analysis is performed in a cluster analysis unit 141 of the cost calculation unit 140. The analysis performed by this unit evaluates the importance or the relevance of the groups. In the sense, the cluster analysis unit 141 performs an analysis on the different groups to check whether a group found is really due to an object or perhaps because some noise or irregularities in the measurements. Such analysis takes the size of the group into account, the cumulative power of the group with respect to the total power at all spots, the shape of the group, etc. Based on that it will be possible to decide whether there are one or more relevant groups other than the one found by directly analyzing I(x,y,L). In general such analysis can be done via machine learning algorithms like histogram analysis, support vector machines (SVM), principal component analysis (PCA), neural networks (NN), etc. Such algorithms are, for instance, described in S. B. Kotsiantis, "Supervised Machine Learning: A Review Classification", Infomatica, vol. 31, pp. 249-268, 2007. Such algorithms are generally known in the art and can be integrated in the cost calculation unit 140.

Based on the outcome of the machine learning algorithm, an adjustment function $f(-)$ can then be computed by in the cost adjustment unit 142 in order to modify the costs. If one group is found relevant, then the adjustment needs to be done only once before the optimization as in the example shown in FIG. 4. If more than one group is found important, then the optimization should be repeated sequentially for each different adjustment function $f(-)$ as shown in the repetition unit 160 (also called decision unit hereinafter) in FIG. 2. In this case, the resulting first image 80 should be updated according to the updated costs to show the other hidden or relevant spots or voxels in the different groups. The cost calculation unit 140 preferably passes information to the repetition unit 160 that that there are more layers.

An adjustment function is then preferably calculated for each of the found relevant groups. In one embodiment, the function $f(-)$ that adjusts the costs of the relevant group resides in sequentially multiplying the hidden spots by a scalar factor ρ so that one of the corresponding spots of the group present an extremum as shown in FIG. 4 for example. In this way, all the spots that belong to the relevant cluster will be equally adjusted. In another embodiment, the adjustment unit 142 can modify the costs of the different spots in the relevant group adaptively.

The adjustment of the costs can be done in this case by a similar analysis as described in US 2011/0181461 A1 but applied to each of the clusters 210, 220 alone and not to the whole SI 200. One example is to apply adaptive smoothing like the multi-quadric b-Splines algorithm described in R. K. Beatson and N. Dyn, "Multiquadric b-splines", Journal of Approximation Theory, pp. 1-24, October 1996 in each cluster.e right term of equation (1) expresses the interaction between the neighboring pixels. This means that the role of this term is mainly to enforce the properties of the radar surface on the reconstructed image. Therefore, it is preferable that the term $\psi(L,L_i)$ be chosen according to the properties that are to be enforced on the image to be reconstructed. In general, this term should allow the reconstructed image to vary smoothly except when there are edges where there are some jumps. The term $\psi(L, L_i)$ should be proportional to the difference between the label of each pixel and that of its neighbors. One way to express this mathematically according to the present disclosure is by writing ψ in the form $$\psi(L,L_i)=\phi(|L-L_i|^l) \qquad (3)$$

Figure 6:
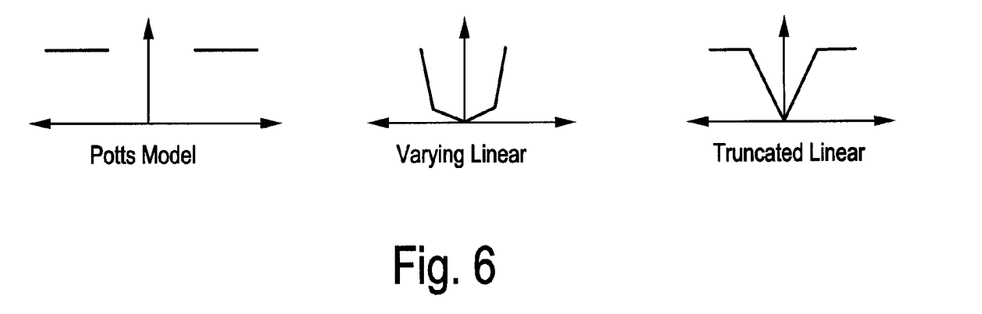
FIG. 6 shows various embodiments of the interaction between the pixels according to the present disclosure.

The form of the term $\psi(L,L_i)$ presented in equation (3) is the general way to express the interaction among the neighboring pixels according to the present disclosure. In one embodiment it is possible to take the Potts energy model which assigns two values for the differences between the labels depending if $|L-L_i|^l$ is below or above a certain threshold Q. Another alternative embodiment is to use the varying linear model. The latter assigns values $|L-L_i|^l$ depending on two threshold values $Q_1$ and $Q_2$, where $Q_1 \leq Q_2$. In other words, $|L-L_i|^l$ will assign linearly increasing cost value values if its value is less than $Q_1$, $|L-L_i|^l$ will lead to a different increase in the cost value $J_2$ if its value is between $Q_1$ and $Q_2$. In still another embodiment the truncated distance model can be used which means that $|L-L_i|^l$ will increase linearly up to certain value after which it becomes constant. An example of these three cases in shown in FIG. 6.

More details on these variations can be found in C. Leung, "Efficient methods for 3D reconstruction from multiple images", Chapter 4, pp. 80-134, PhD thesis, University of Queensland, February 2006. In a preferred embodiment of the present disclosure, the term $\psi(L,L_i)$ can be defined as a truncated linear model while respecting equation (3) as follows $$\psi(L,L_i)=\min(|L-L_i|,\tau) \qquad (4a)$$

In this way, the label difference follows a linear model. It increases up to a threshold $\tau$ after which it becomes constant. Another preferred embodiment is the Potts model and which can be written in the form $$\psi(L,L_i)=(|L-L_i|>0) \qquad (4b)$$

Here, the label difference between the pixels is treated as a piecewise constant function. Which values the discontinuity function uses in equation (3), i.e. $\lambda$ and $\tau$ in case of equations (1) & (4a) or $\lambda$ in case of equations (1) & (4b) or any parameters induced by the applied discontinuity cost model, depends on the optimization algorithm. But in general, these terms are positive real numbers. The solution or configuration $\Delta$ associated with the extremum of the energy, i.e. where $E(\Delta)$ is a global extremum, will be the reconstructed radar image according to the present disclosure. But it should be noted that the global extremum depends on the optimization algorithm, the costs defined in above and the interactions between the neighboring pixels as defined herein. In addition, if more than one possible solution is possible as suggested above, the extremum might differ after each cost modification.

The goal of the optimization algorithm used according to a preferred embodiment of the present disclosure is to find the global optimum of equation (1) that corresponds to the radar image. Therefore, the optimal label L should be determined that corresponds to one of the measured spots in the SI for each pixel from the SI such that $0<L\leq N$ and N is the number of spots/pixel while satisfying equation (1). In its simplest form, the optimization can be done by finding the extremum after the cost calculation with respect to each pixel only. However, a preferred embodiment of the present disclosure is to perform a global optimization scheme as will be explained in the following.

Global optimization comprises optimizing equation (1) over the whole SI at the same time. The optimal label for each pixel in the reconstructed image will therefore be dependent on all the other pixels. This can be expressed mathematically as follows $$E(\Delta) = \sum_{(x,y)\in SI} C(x,y,L) + \lambda \sum_{(x,y)\in SI} \sum_{x_i,y_i} \psi(L,L_i). \qquad (5)$$

To reconstruct the image using a global optimization concept, the equation (5) is preferably optimized over the whole SI. Good candidates for doing that are any convex or energy optimization method but defined over the whole SI. Many examples algorithms are available in the state of the art.

Figure 7:
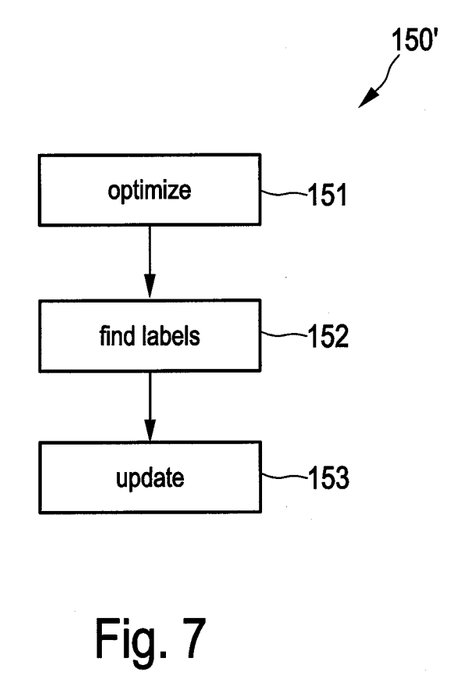
FIG. 7 shows a block diagram of an embodiment of an optimization unit according to the present disclosure.

Those algorithms are described in references S. Boyd and L. Vandenberghe, "Convex Optimization", Cambridge University Press, 2009, J. Yedidia, W. T. Freeman and Y. Weiss, "Understanding Belief Propagation and its Generalizations", Technical Report-2001-22, Mitsubishi Electric Research Laboratories, January 2002, and Y. Boykov, O. Veksler and R. Zabih, "Fast approximate energy minimization via graph cuts", IEEE Transactions on Pattern Analysis and Machine Intelligence, pp. 1222-1239, November 2001. A preferred embodiment of the global optimization unit 150' as used according to the present disclosure is schematically shown in FIG. 7. Many variations of this embodiment exist and can be easily made by a skilled person to reconstruct a radar image.

Global optimization is, for instance, implemented with belief propagation (BP). BP is a message passing algorithm. The global optimization unit 150' comprises an optimization element 151 that optimizes equation (5), a label finding unit 152 that finds the labels for each pixel in the SI that corresponds to the extremum of equation (5) according to the optimization, and an updating unit 153 that updates the constructed image with the labels.

In more detail, according to an embodiment the optimization unit 150' performs the optimization of equation (5) by performing an inference on the Markov Random fields, i.e. a graphical model, formed by calculating the marginal distribution of the nodes a graph. The nodes of the graph are the pixels of the radiometric image to be reconstructed. In terms of the present disclosure, BP is an iterative algorithm that operates on a connected grid. This means that BP passes at each iteration "t" a message from one node to at least one of its neighboring nodes in the connected grid. The connected grid can be as simple as the checkerboard scheme, i.e. the left, right, up and down nodes affect the current node or any other connectivity applied in BP.

Irrespective of the connectivity assumed on the grid, let p and q be two neighboring nodes in the graph. In order to be consistent with equation (5), let p has the coordinates $(x_p, y_p)$ in the SI and a possible label $L_p$ and let q has the coordinates $(x_q, y_q)$ in the SI and a possible label $L_q$. The message $m^t_{p\to q}$ that has to be passed according to an embodiment of the present disclosure from node p to node q at iteration t and using equation (5) has the form $$m^t_{p\to q}(L_p) = C(x_p, y_p, L_p) + \lambda\psi(L_p, L_q) + \sum_{g\in G(p), g\neq q} m^{t-1}_{g\to p}(L_p) \qquad (6)$$

where G(p) denotes the neighbors of p in the connected graph and the term $g\in G(p), g\neq q$ denotes all the neighbors of node p in the graph to the exception of q. Preferably, the messages are initialized with 0 at the first iteration. After T iterations, a belief vector will be computed at each node or pixel in the graph which has the form $$V(L_q) = C(x_q, y_q, L_q) + \sum_{p\in G(q)} m^T_{p\to q}(L_q) \qquad (7)$$

The dimension of this vector is the number of all the possible labels M in the SI. Consequently, the label $L_q$ that optimizes individually $V(L_q)$ at each node (or pixel), i.e. extremum of $V(L_q)$, is the optimal label that has to be chosen for each pixel in the reconstructed radar image. In addition, this label is the globally optimal label for the pixel that satisfies equation (5) in terms of BP according to the present disclosure.

Figure 8:
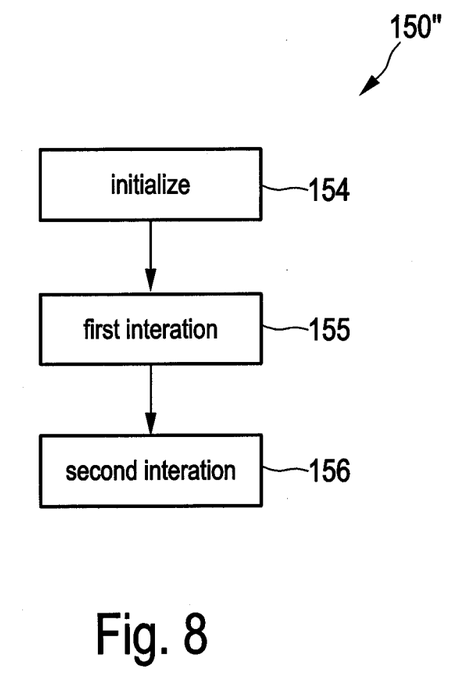
FIG. 8 shows a block diagram of an embodiment of an optimization unit according to the present disclosure.

An embodiment of the optimization unit 150" employing BP in the present disclosure is schematically depicted in FIG. 8. It comprises an initialization unit 154 that initializes the BP messages to zero, first iteration unit 155 and a second iteration unit 156. The first iteration unit 155, running from 1 to T, for every node and for every possible label every message is passed from each node to its neighbors according to equation (6). In the second iteration unit 156 for every node the extremum of the Belief Vector at each node is found according to equation (7) and the constructed image is updated with the corresponding label of the extremum.

The embodiment of BP is not the only variation that can be used according to the present disclosure. There are many variations of the BP concept in the state of the art that can be used. In addition, the presented embodiment can be easily exported to other optimization algorithms that solve the inference problem. One example is closely related to BP is Graph Cuts. As a result, all the optimization algorithms that solve the inference problem, e.g. BP and graph cuts, and all the other convex or energy optimization algorithms are alternative embodiments to global optimization. Any of these can generally be used to reconstruct the radar image according to the present disclosure.

It should be also noted that if more than one important or hidden layers are detected by the cost calculation unit, the process should be repeated to generate more than one image. This is decided by the repetition unit 160. In other words, if the cost calculation unit 140 detects more than one candidate hidden layer, the cost calculation unit 140 is called another time after having reconstructed an image 80 to repeat the process again from the cost calculation and emphasize on the other hidden layers.

The elements 120 to 160 of the imaging device 100 may be implemented as separate units, e.g. separate processors or dedicated hardware elements. In one embodiment, however, they are implemented in a processing apparatus 170, as indicated by the dashed lines in FIG. 2 that is appropriately programmed or installed to carry out the functions of these units.

To confirm the functionality of the present disclosure, some results of constructed images using the present disclosure from the samples captured by focused FMCW active millimeter-wave radar (spot radar) are presented. One image of many objects placed on a table is captured as shown in FIG. 1A. The spots were standardized and processed by a logarithm transform. The SI was of a size of 733×158×256 corresponding respectively to the width of the image, the height of the image and the number of measured spots per pixel. The clustering unit generated clusters for the spots of each pixel only using K-means clustering. Further, histogram analysis was used to analyze the clusters at each pixel and then weight the relevant clusters accordingly with a constant value. The preferred embodiment of the present disclosure with BP shown in FIG. 8 and illustrated in equation (6) was used to construct the radar image, i.e. find the optimal label or spot of each pixel. The resulting constructed images have a size of 733×158 pixels. The constant $\lambda$ was set to 0.5. The results are shown in FIG. 1, where FIG. 1B shows the height profile of the scene shown in FIG. 1A obtained by conventional processing the data of a millimeter-wave active radar sensor and FIG. 1C shows the modified height profile after applying the embodiment of the present disclosure using belief propagation. It can be directly seen that the FIG. 1C can, for instance, show the hidden CD 42 and video tape 41, while preserving the key features of the other objects 40, 43-49. The image is also less noisy and shows a significant reduction in artifacts (which can, for instance, be seen at the border of the scissors). This allows a better post-analysis of the radar images for various applications like security screening.

Figure 9A:
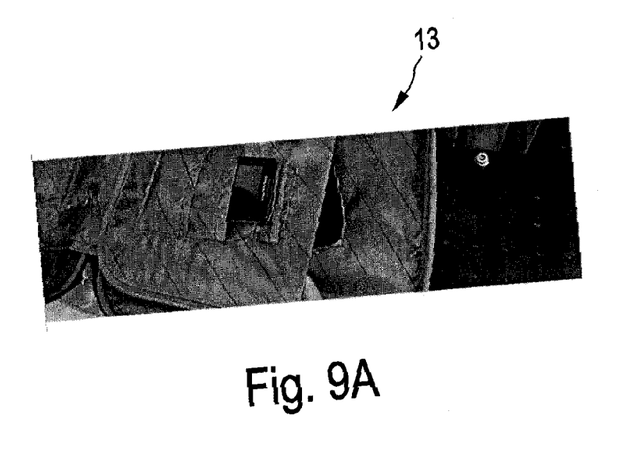
FIGS. 9A-9C shows images illustrating the results of the present disclosure.
Figures 9B, 9C:
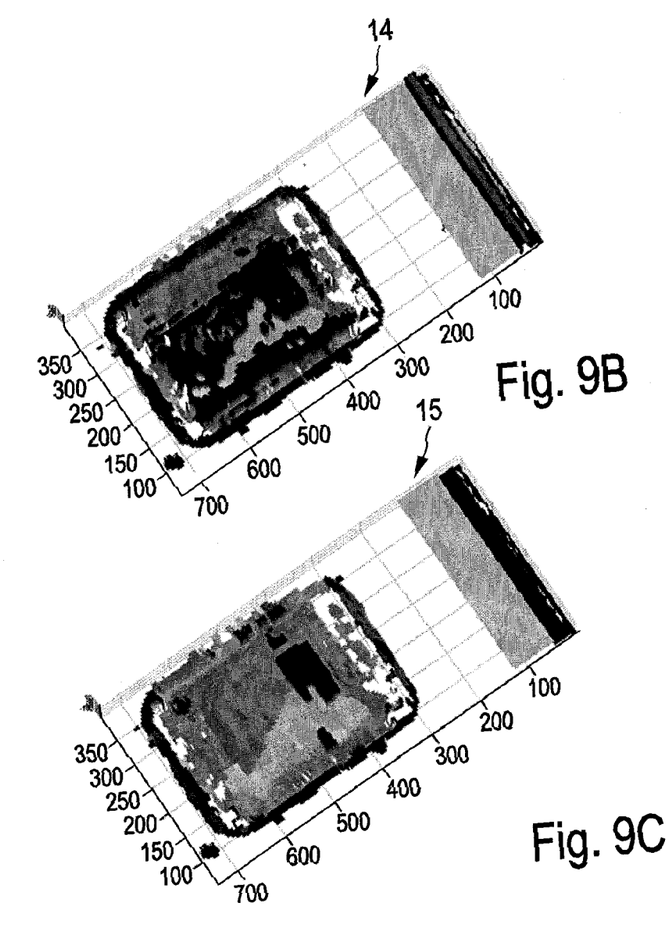

Another is example is shown in FIGS. 9A-9C. Here, FIG. 9A shows an optical image 13 of a suitcase with a mobile phone and a gun inside. In this case, the same processing is applied as explained above for FIGS. 1A-1C, but a Graph Cuts algorithm is applied for optimization. FIG. 9B shows a height profile 14 after conventional optimization, and FIG. 9C shows the modified height profile 15 after applying the embodiment of the present disclosure using Graph Cuts. The size of the SI was 728×82×201, the resulting image was of size 728×82 and the value of $\lambda$ used was set to 0.1. It can be easily seen how the gun and the mobile phone are better emphasized in FIG. 9C.

In summary, according to the present disclosure an imaging method and device that are able to reconstructing an image of a scene showing one or more hidden, not directly visible objects. The reconstruction task is dealt with as an energy minimization problem. A cost function composed of two parts is formulated, wherein the first part takes the interactions among the neighboring pixels of the image to be reconstructed into account and the second part is based on the measured power at each spot in the range of interest. Several techniques like clustering and/or segmentation algorithm, preferably in combination with machine learning, are used to target the optimization towards the desired important spots, e.g. to reveal the hidden objects in a target. The present disclosure further provides solutions to solve the cost function using various optimization algorithms like belief propagation and graph cuts. The measurement values used for the imaging may be obtained from active and/or passive millimeter-wave and sub-millimeter radar data.

The present disclosure has been illustrated and described in detail in the drawings and foregoing description, but such illustration and description are to be considered illustrative or exemplary and not restrictive. The present disclosure is not limited to the disclosed embodiments. Other variations to the disclosed embodiments can be understood and effected by those skilled in the art in practicing the present disclosure, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

The invention claimed is:

1. An imaging device comprising:
   a detector that detects electromagnetic signals in a predetermined spectral range from a plurality of positions of a scene to obtain a three-dimensional data set of measurement values at a plurality of spots arranged at different positions and different depth levels; and
   circuitry that determines pixel values of pixels of one or more images to be reconstructed, the circuitry
      segmenting the data set into one or more data sub-sets, each data sub-set comprising a plurality of measurement values of one or more neighboring spots;
      determining, per pixel, costs for the measurement values acquired at a position corresponding to a position of the pixel by modifying the measurement values of one or more data sub-sets that include at least one measurement value acquired at a position corresponding to the position of the pixel;
      determining a pixel value for a pixel by determining a label value from a set of label values, a label indicating a spot among the spots arranged at positions corresponding to the position of the pixel; and
      selecting the measurement value at the spot indicated by the determined label as the pixel value, wherein the label value is determined by determining an extremum of energy values determined for different spots of the data set based on an energy function, the energy function forming a sum adding a first summand including the costs of the spots at the position corresponding to the position of the pixel for which the energy value is determined, and a second summand taking into account at least one of the costs of at least one neighboring spot at a neighboring position and a neighboring depth value within the data set.

2. The imaging device according to claim 1, wherein the circuitry calculates costs for a spot from the energy, power, temperature or reflectivity measured at the spot.

3. The imaging device according to claim 1, wherein the circuitry determines whether measurement values of a data sub-set are caused by an object or by noise or irregularities.

4. The imaging device according to claim 3, wherein the circuitry checks at least one of a number, cumulative power and power distribution of measurement values of neighboring spots belonging to a data sub-set to determine whether the measurement values of the data sub-set are substantially caused by an object or by noise or irregularities.

5. The imaging device according to claim 3, wherein the circuitry performs at least one of a histogram analysis, a support vector machine, a principal component analysis and a neural network to determining whether the measurement values of a data sub-set are substantially caused by an object or by noise or irregularities.

6. The imaging device according to claim 1, wherein the circuitry modifies the measurement values of one or more of the data sub-sets that include at least one measurement value acquired at a position corresponding to the position of the pixel by relatively increasing the measurement values of one or more of the data sub-sets with respect to the measurement values of the first data sub-set arranged at a depth level closest to the detector among the data sub-sets.

7. The imaging device according to claim 6, wherein the circuitry modifies the measurement values of one or more of the data sub-sets that include at least one measurement value acquired at a position corresponding to the position of the pixel by at least one of increasing the measurement values of the one or more data sub-sets and decreasing the measurement values of the other data sub-sets.

8. The imaging device according to claim 1, wherein the circuitry repeats the processing to reconstruct one or more images at further depth levels if there are more than two data sub-sets that include at least one measurement value acquired at a position corresponding to the position of the pixel.

9. The imaging device according to claim 1, wherein the circuitry applies an energy function including a second summand based on the costs of at least one neighboring spot within the data set.

10. The imaging device according to claim 1, wherein the circuitry applies an energy function taking the costs of the neighboring spots as a function of difference between the label values.

11. The imaging device according to claim 1, wherein the circuitry applies belief propagation to determine the label values for the pixels by determining an extremum of the energy values associated with the label values.

12. The imaging device according to claim 1, wherein the circuitry applies belief propagation or graph cuts to determine label values for the pixels by determining an extremum of the energy values associated with the label values.

13. The imaging device according to claim 1, wherein the circuitry assigns a label to each spot in the data set, the label identifying the spot, assigns cost values to the labels and determines energy values for the labels by applying the energy function, the energy function forming a sum adding a first summand including the costs of the label, for which the energy value is determined, and a second summand taking account of the costs of at least one label of at least one neighboring spot.

14. The imaging device according to claim 1, wherein the circuitry assigns the set of labels for each pixel as a number of the spots measured within the data set.

15. The imaging device according to claim 1, wherein the imaging device is configured to perform passive radiometric imaging.

16. The imaging device according to claim 1, wherein the imaging device is configured to perform active radar imaging, and
the detector transmits radiation in at least the predetermined spectral range to the scene and receives radiation reflected from the scene in response to the transmitted radiation.

17. The imaging device according to claim 16, wherein the detector is configured as a Frequency-Modulated Continuous Wave (FMCW) radar, a pulse radar or a reflect array.

18. The imaging device according to claim 1, wherein the circuitry decides, based on a result of the cost calculation and on the number of data sub-sets for a pixel, whether to reconstruct another image.

19. An imaging method performed by an imaging device, the imaging method comprising:
 detecting electromagnetic signals in a predetermined spectral range from a plurality of positions of a scene to obtain a three-dimensional data set of measurement values at a plurality of spots arranged at different positions and different depth levels;
 segmenting, by circuitry of the imaging device, the data set into one or more data sub-sets, each data sub-set comprising a plurality of measurement values of one or more neighboring spots;
 determining, by the circuitry, per pixel, costs for the measurement values acquired at a position corresponding to a position of the pixel by modifying the measurement values of one or more data sub-sets that include at least one measurement value acquired at a position corresponding to the position of the pixel;
 determining, by the circuitry, a pixel value for a pixel by determining a label value from a set of label values, a label indicating a spot among the spots arranged at positions corresponding to the position of the pixel; and
 selecting the measurement value at the spot indicated by the determined label as the pixel value, wherein
 the label value is determined by determining an extremum of energy values determined for different spots of the data set by applying an energy function, the energy function forming a sum adding a first summand including the costs of the spots at the position corresponding to the position of the pixel for which the energy value is determined, and a second summand taking into account at least one of the costs of at least one neighboring spot at a neighboring position and a neighboring depth value within the data set.

20. An information processing apparatus comprising:
processing circuitry that
    acquires a three-dimensional data set of measurement values at a plurality of spots arranged at different positions and different depth levels;
    segments the data set into one or more data sub-sets, each data sub-set comprising a plurality of measurement values of one or more neighboring spots;
    determines, per pixel, costs for the measurement values acquired at a position corresponding to a position of the pixel by modifying measurement values of one or more data sub-sets that include at least one measurement value acquired at a position corresponding to the position of the pixel;
    determining a pixel value for a pixel by determining a label value from a set of label values, a label indicating a spot among the spots arranged at positions corresponding to the position of the pixel;
    selects the measurement value at the spot indicated by the determined label as the pixel value, wherein
    the label value is determined by determining an extremum of energy values determined for different spots of the data set by applying an energy function, the energy function forming a sum adding a first summand including the costs of the spots at the position corresponding to the position of the pixel for which the energy value is determined, and a second summand taking into account at least one of the costs of at least one neighboring spot at a neighboring position and a neighboring depth value within the data set.

21. An imaging method performed by an imaging device, the imaging method comprising:
    acquiring, by processing circuitry, a three-dimensional data set of measurement values at a plurality of spots arranged at different positions and different depth levels;
    segmenting, by the processing circuitry of the imaging device, the data set into one or more data sub-sets, each data sub-set comprising a plurality of measurement values of one or more neighboring spots;
    determining, by the processing circuitry, per pixel, costs for the measurement values acquired at a position corresponding to a position of the pixel by modifying the measurement values of one or more data sub-sets that include at least one measurement value acquired at a position corresponding to the position of the pixel;
    determining, by the processing circuitry, a pixel value for a pixel by determining a label value from a set of label values, a label indicating a spot among the spots arranged at positions corresponding to the position of the pixel; and
    selecting the measurement value at the spot indicated by the determined label as the pixel value, wherein
    the label value is determined by determining an extremum of energy values determined for different spots of the data set by applying an energy function, the energy function forming a sum adding a first summand including the costs of the spots at the position corresponding to the position of the pixel for which the energy value is determined, and a second summand taking into account at least one of the costs of at least one neighboring spot at a neighboring position and a neighboring depth value within the data set.

22. A computer readable non-transitory medium having instructions stored thereon which, when carried out on a computer, cause the computer to perform the steps of the method as claimed in claim 21.

* * * * *